June 2, 1953  F. C. MOEBIUS  2,640,873
MOTOR CONTROL DEVICE
Filed March 2, 1951
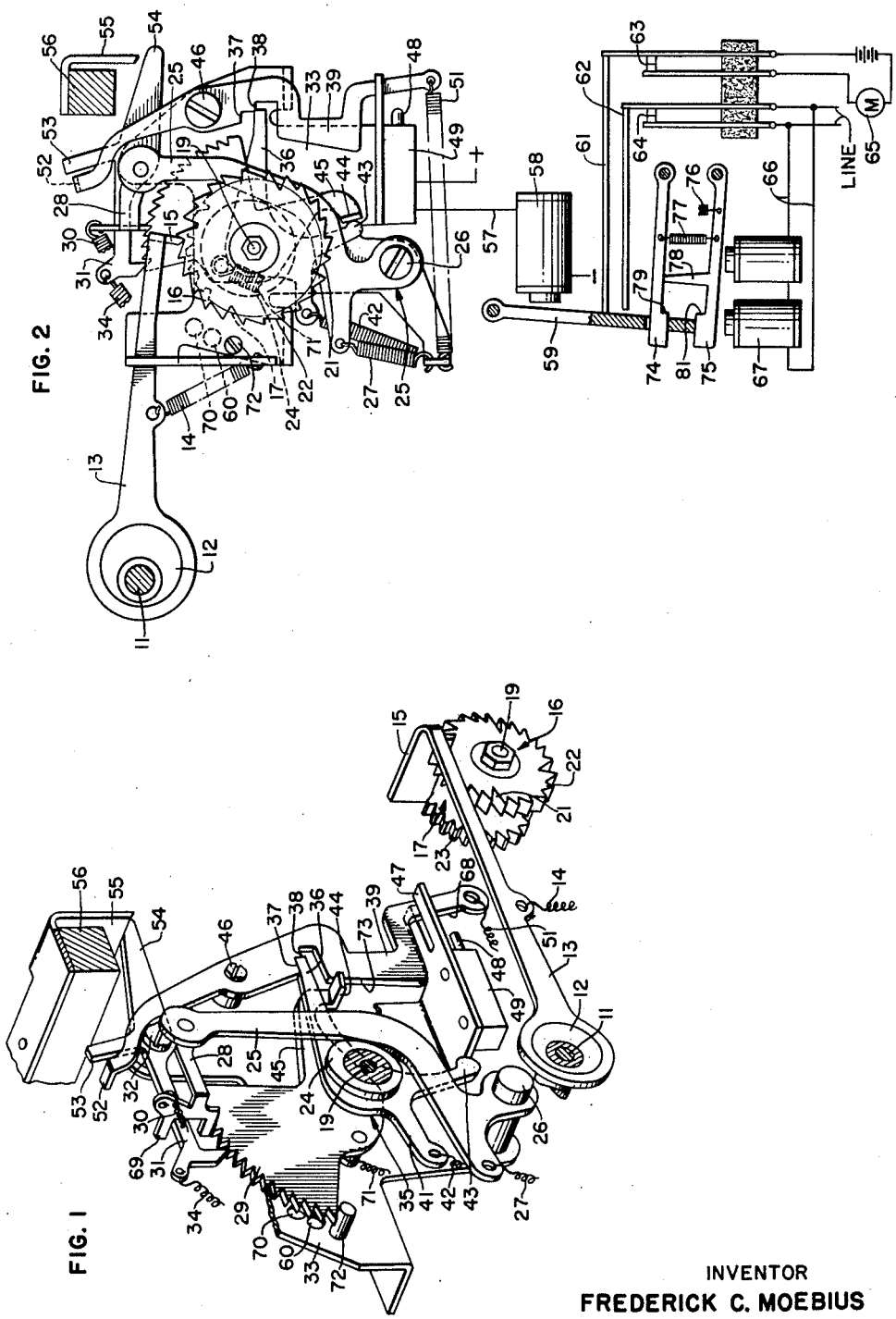
INVENTOR
FREDERICK C. MOEBIUS
BY Emery Robinson
ATTORNEY Patented June 2, 1953

2,640,873

UNITED STATES PATENT OFFICE 2,640,873

MOTOR CONTROL DEVICE

Frederick C. Moebius, Wheaton, Ill., assignor to Teletype Corporation, Chicago, Ill., a corporation of Delaware Application March 2, 1951, Serial No. 213,605

3 Claims. (Cl. 178—4.1)

This invention pertains to remote control systems and apparatus and more particularly to automatic motor stop mechanisms.

The principal object of the present invention is to provide an accurate and efficient time delay mechanism for automatically controlling the stopping of a motor.

Another object of the invention is to provide a time delay mechanism having a quick reset feature capable of controlling the delayed time to within very close limits.

The system according to the present invention is particularly adapted to telegraph lines having unattended stations. In such stations it is desirable to stop the motors automatically when no signals are received for a predetermined period and to start the motors upon resumption of signal transmission. The present motor control arrangement can be embodied in an apparatus for the transmission and/or reception of intelligence such that when there is no traffic on the signal line for a predetermined period, the motors at all of the connected stations are stopped.

The foregoing and other objects and features of the invention are obtained by providing an automatic motor stop mechanism or control device including timing facilities comprisng a first ratchet wheel havng every seventh tooth cut twice the depth of the normal teeth, a second ratchet wheel juxtapositioned to said first ratchet wheel, a pawl normally engageable with said first ratchet and adapted to engage both ratchets periodically (every seventh step in the present embodiment), a cam associated with said second ratchet, and a pawl-operated ratchet segment controlled by said cam to time the operation of a motor control contact.

A more comprehensive understanding of the invention may be had from the following description, taken in conjunction with the accompanying drawings, wherein, Fig. 1 is a perspective representation (partially exploded) of the motor control timing device according to the present invention, and Fig. 2 is an elevational view of the arrangement according to the invention together with a diagrammatic illustration of the electrical components associated therewith.

Having reference to Fig. 1 of the drawings, a shaft 11 is constantly rotated by a motor (not shown). Rotatable with shaft 11 is an eccentric 12 on which is carried a pawl member 13 normally biased clockwise (as viewed in Fig. 1) by a spring 14. Pawl member 13 terminates at its free end in a laterally disposed tooth portion 15 of sufficient width to span and engage the peripheral teeth of two juxtapositioned ratchet wheels 16 and 17 freely carried on a shaft 19.

In the embodiment shown, every seventh tooth 21 on ratchet wheel 16 is cut approximately twice as deep as the regular teeth 22, thus permitting pawl tooth 15 to drop to the bottom of the deeper cut tooth 21. In so doing, the pawl tooth 15 becomes engaged with the teeth 23 of the adjacent ratchet wheel 17. The bottom of teeth 23 coincide with the bottom of the teeth 21 of ratchet wheel 16, and in the embodiment shown the teeth 23 are truncated so that the tops thereof do not extend above the bottom of teeth 22 (Fig. 2).

Thus, as reciprocative motion is imparted to pawl 13 by the eccentric 12 on shaft 11, step-by-step rotation is imparted to ratchet wheel 16. No motion is imparted to ratchet wheel 17 while the pawl tooth 15 is engaging the shallow teeth 22 of ratchet wheel 16. However, whenever a deep tooth 21 is encountered by the pawl tooth 15, a tooth 23 on ratchet wheel 17 is simultaneously engaged and accordingly both ratchet wheels 16 and 17 are stepped one tooth or step.

Integral with ratchet wheel 17 is a cam 24 adapted to cooperate with lever 25 mounted pivotally on a pivot shaft 26. Lever 25 is normally biased counterclockwise against cam 24 by a spring 27. Pivotally articulated to the extremity of lever 25 is a pawl member 28 which cooperates, under the influence of spring 30, with a ratchet segment 29 freely mounted on the shaft 19. Pawl 28, through lever 25, is reciprocated once for each revolution of cam 24 to step the ratchet segment 29 clockwise. A pawl 31 acts as an anti-reverse or detent pawl for the ratchet segment 29. Detent pawl 31 is pivotally mounted on a pivot stud 32 secured to a bracket 33 suitably mounted in the apparatus embodying the motor control device according to the invention. Pawl 31 is normally biased into engagement with ratchet segment 29 by a spring 34.

Freely mounted on shaft 19, between the cam 24 and the ratchet segment 29 is a three-armed lever 35. Arm 36 of lever 35 cooperates with stepped shoulders 37 and 38 of a contact operating lever 39. To arm 41 is attached one end of a spring 42 which normally urges lever 35 in a counterclockwise direction. Lever 35 is also provided with a depending arm 43 which cooperates with the laterally directed end 44 of an arm 45 of the ratchet segment 29. Lever 39 is supported pivotally on a stud 46 attached to bracket 33. The lower end of lever 39 is guided in a portion 47 of bracket, and is conformed to operate a plunger 48 of a switch 49 secured to bracket 33. Lever 39 is normally biased clockwise by a spring 51. The upper extremity of lever 39 is provided with a laterally directed portion 52 which cooperates with a vertically extending projection 53 of the detent pawl member 31. The tail portion 54 of detent pawl 31 is adapted to cooperate with a bail member 55 carried on a rock shaft 56 appropriately positioned in the apparatus. The shaft 56 is analogous to the shaft 371 shown in Fig. 15 of United States Patent No. 2,505,729.

As previously mentioned, the lower arm of lever 39 cooperates with the plunger 48 of a switch 49. Having reference to Fig. 2, switch 49 controls a circuit extending from positive battery source, through switch 49, over conductor 57, through the winding of magnet 58 to negative battery. Magnet 58 is a part of a control device comparable to the arrangement disclosed in United States Patent No. 1,964,268, schematically shown herein. Magnet 58 is provided with an armature 59 which, through a pair of plunger type links 61 and 62, controls a pair of contacts 63 and 64, respectively. Contacts 63 are included in the circuit of a motor 65, and contacts 64 are included in the signal line circuit. The line circuit extends over conductors 66 through a line magnet 67, which is shunted when the contacts 64 are closed.

As previously described, the reciprocating pawl 13 operates to rotate the ratchet wheel 16 step-by-step, and at every seventh step the pawl 13 functions to step the ratchet wheel 17 one step, due to the deeper channel between teeth thereat. Assuming that there are twenty-eight teeth on the periphery of ratchet wheel 16, then ratchet wheel 17 will be moved four steps for each revolution of ratchet wheel 16. Then, upon seven revolutions of ratchet wheel 16, the ratchet wheel 17 will be rotated one revolution (assuming that the ratchet 17 also has twenty-eight teeth). Upon each rotation of ratchet 17, the cam 24 will be rotated once.

Each complete rotation of cam 24 will cause the segment 29 to be actuated one step. Thus, as the segment 29 is stepped along, the lateral portion 44 thereof will approach the extremity of arm 43. When the arm 43 is thus engaged and a further step is imparted to the segment 29, the lever 35 is rotated to disengage arm 36 thereof from the shoulder 37 of lever 39, to permit arm 36 to engage shoulder 38. As a result, the lever 39 is actuated clockwise by its spring 51, to cause its surface 68 to impinge against the plunger 48, to depress said plunger 48 to operate the switch 49, thereby completing the aforementioned circuit to energize the magnet 58. Substantially simultaneously with the operation of the switch 49, the lateral portion 52 of lever 39 will strike projection 53 of the detent pawl 31 to disengage the pawl 31 from the segment 29. At the same time, pawl 31 will engage the projection 69 of pawl 28 to also disengage pawl 28 from the segment 29, to thereby permit the spring 71 to return the segment against the stop 72. Since every tooth on the segment 29 represents a unit of time commensurate with the time required for cam 24 to complete a cycle of rotation, the accumulated time may be varied or adjusted by inserting the stop stud 72 in either of the holes 60 or 70. Segment 29 in thus returning to its counterclockwise position against the stop 72, will cause its portion 44 of arm 45 to bear against the surface or edge 73 of lever 39 to thereby cam the lever 39 counterclockwise to permit the lever arm 36 to again engage the shoulder 37 of lever 39 preparatory to beginning a new timing sequence. As the lever 39 is thus returned to its counterclockwise position, the portion 52 moves away from the projection 53, thereby permitting the pawls 28 and 31 to again engage the ratchet segment 29.

In the operation of the motor control device shown in Fig. 2, it is assumed that the circuit for motor 65 is closed at the contacts 63 and hence the motor of the telegraph apparatus is running and that, therefore, the main shaft 11 is rotating. The main shaft 11 in rotating, thus causes the pawl 13 to be reciprocated to step the ratchets 16 and 17. It is further assumed that there is traffic on the signal line and accordingly the rock shaft 56 will be rocked cyclically for each cycle of operation of the telegraph apparatus in response to signals received. The bail 55 will therefore act upon the projection 54 of detent pawl 31 for each rocking cycle of the shaft 56, to prevent the stepping of ratchet segment 29 during the normal printing operation of the telegraph apparatus. Therefore, switch 49 cannot operate to close the circuit for magnet 58, except in response to prolonged cessation of operation of shaft 56.

Now, if traffic on the signal line should cease, then the bail 55 will no longer oscillate, but remain in its solid line position, while the main shaft 11 is still rotating to continue to reciprocate the pawl 13. The ratchet wheels 16 and 17 will continue to be rotated to impart rotation to the cam 24 to, in turn, through lever 25 and pawl 28, impart step-by-step rotation to the ratchet segment 29 until the lateral projection 44 impinges against arm 43 to rock the lever 35 to disengage arm 36 from shoulder 37 and engage shoulder 38 to enable lever 39 to respond to the pull of spring 51 to depress the plunger 48 to operate the switch 49, thereby completing the circuit for magnet 58.

The magnet 58, upon operating, will pull up its armature 59, and through members 61 and 62 cause contacts 63 and 64 to be opened. The motor 65 will stop running due to the cutting off of the power therefor by the opening of contacts 63. The armature 59 becomes latched in its attracted position by a latch element 74. This is necessary because the shaft 11 does not stop immediately, but only gradually as the motor 65 is brought to a stop. When the shunt contacts 64 are opened, the magnet 67 will be energized by the line circuit current, which is normally marking in the stop condition. Magnet 67, when operated will pull up its armature 75 against the pull of its spring 76. A spring 77 normally pulls latch 74 and armature 75 toward each other, and a projection 78 integral with the armature 75 limits the space between latch 74 and armature 75. When the magnet 58 is energized and the armature 59 is attracted, the contact 64 opens and the magnet 67 is immediately energized and its armature 75 is pulled up, stretching spring 77 and permitting the armature 59 to be held latched by shoulder 79. This condition will persist so long as no signals are received on the signal line, which therefore remains in a marking condition (current on the line).

However, as soon as a spacing or no current signal is received, the armature 75 will be released and its spring 76 will actuate it until the projection 78 strikes the latch 74 to raise latch 74 out of latching engagement with the shoulder 79. It must be understood however, that when the de-energization of magnet 67 occurs, the armature 59 is still pulled up, and therefore the end of armature 59 becomes latched up by the shoulder 81 of armature 75. Thus, sufficient clearance is provided for the unlatching latch 74 from armature 59, and the latching of armature 59 by shoulder 81 of armature 75 instead. This substitution of latching elements for armature 59 is a precautionary measure in the event the occurrence of a spacing condition is a line break instead of a spacing impulse inherent in signaling. Thus, if a break in the line circuit should occur after the motor has been stopped as just described, the motor 65 will not be started accidentally. Then when a marking condition (closed line) again occurs the magnet 67 will be operated and the armature 75 will be pulled up to release armature 59 and cause the closure of contacts 63 and 64, thereby starting the motor 65 and shunting the magnet 67.

Although the invention has been described in connection with a certain specific form thereof, it will be understood that it has further application, and that it is not limited by the embodiments shown for illustration.

What is claimed is:

1. In combination, a timing mechanism comprising a first toothed member having periodic occurrences of teeth of predetermined greater depth, an integral cam and toothed member juxtapositioned to said first toothed member, an actuator, said actuator normally engageable solely with said first toothed member and adapted under the control of said deeper teeth to periodically engage simultaneously both said toothed members to impart movement intermittently to said integral member, a toothed segment, a cam follower controlled by the cam portion of said integral member, means carried by said cam follower for imparting stepwise movement to said toothed segment, a control switch, an instrumentality for operating said switch, means controlled by said segment for governing the control of said instrumentality over said switch, and a signal controlled cyclically operated means normally effective during signal reception to cyclically render said first recited means ineffective, whereby upon a cessation of operation of said signal controlled means said toothed segment is effective to operate said switch.

2. In combination, a timing mechanism comprising a first toothed member having periodic occurrences of teeth of predetermined greater depth, an integral cam and toothed member juxtapositioned to said first toothed member, a common actuating member, said actuating member normally engageable solely with said first toothed member and adapted under the control of said deeper teeth to periodically engage simultaneously both said toothed members to impart movement intermittently to said integral member, a toothed segment, a cam follower controlled by the cam portion of said integral member, actuating pawl means carried by said cam follower for imparting stepwise movement to said toothed segment once for each revolution of said integral member, a control switch, a lever for operating said switch, means controlled by said segment for governing the control of said lever over said switch, and a signal controlled cyclically operated means, normally effective during signal reception to cyclically render said actuating pawl means ineffective, whereby upon a cessation of operation of said signal controlled means said toothed segment is effective to operate said switch.

3. In combination, a timing mechanism comprising a first toothed member having periodic occurrences of teeth of predetermined greater depth, an integral cam and toothed member juxtapositioned to said first toothed member, an actuator, said actuator normally engageable solely with said first toothed member and adapted under the control of said deeper teeth to periodically engage simultaneously both said toothed members to impart movement intermittently to said integral member, a toothed segment having an initial position and an operating position, a cam follower controlled by the cam portion of said integral member, means carried by said cam follower for imparting stepwise movement to said toothed segment from its initial position to its operating position, a control switch, an instrumentality for operating said switch, means controlled by said segment for governing the control of said instrumentality over said switch, means associated with said instrumentality and effective upon operation of instrumentality for initiating the restoration of said segment to its initial position, and signal controlled cyclically operated means normally effective during signal reception to cyclically render said first recited means ineffective, whereby upon a cessation of operation of said signal controlled means said instrumentality is effective under control of said segment to effect the operation of said switch and concurrently the restoration of said segment to its initial position.

FREDERICK C. MOEBIUS.

References Cited in the file of this patent

UNITED STATES PATENTS

| Number | Name | Date |
|---|---|---|
| 1,688,711 | Hewitt et al. | Oct. 23, 1928 |
| 2,007,371 | Hopkins et al. | July 9, 1935 |
| 2,531,528 | Potts | Nov. 28, 1950 |